(12) United States Patent
Endlich et al.

(10) Patent No.: US 8,523,241 B2
(45) Date of Patent: Sep. 3, 2013

(54) HEADER FOR A HIGH-PRESSURE APPARATUS OF STEAM POWER PLANTS

(75) Inventors: Guenter Endlich, Beckum (DE); Heinz-Josef Woestmann, Ahlen-Vorhelm (DE)

(73) Assignee: Balcke-Durr GmbH, Ratingen (DE)

( * ) Notice: Subject to any disclaimer, the term of this patent is extended or adjusted under 35 U.S.C. 154(b) by 0 days.

(21) Appl. No.: 12/388,476

(22) Filed: Feb. 18, 2009

(65) Prior Publication Data

US 2009/0211744 A1     Aug. 27, 2009

(30) Foreign Application Priority Data

Feb. 19, 2008   (EP) .................................. 08003060

(51) Int. Cl.
    *F16L 39/00*   (2006.01)
(52) U.S. Cl.
    USPC .................................. 285/129.1; 285/125.1
(58) Field of Classification Search
    USPC ........................................... 285/129.1, 125.1
    See application file for complete search history.

(56) References Cited

U.S. PATENT DOCUMENTS

| | | | | |
|---|---|---|---|---|
| 3,740,813 A | * | 6/1973 | Moore | 29/890.148 |
| 3,849,257 A | * | 11/1974 | Bevilacqua | 376/224 |
| 4,246,772 A | * | 1/1981 | Moshnin et al. | 72/358 |
| 4,680,845 A | * | 7/1987 | Miller | 29/890.15 |
| 4,856,824 A | * | 8/1989 | Clausen | 285/124.1 |
| 2006/0207096 A1 | | 9/2006 | Gandy et al. | 29/890.031 |

FOREIGN PATENT DOCUMENTS

| | | |
|---|---|---|
| BE | 556639 A | 4/1957 |
| EP | 52113403 | 9/1977 |
| FR | 1.140.960 A | 8/1957 |
| FR | 71.044 E | 10/1959 |
| GB | 929896 A | 1/1962 |

OTHER PUBLICATIONS

Yokell, S., "Heat-Exchanger Tube-to-Tubesheet Connections", Chemical Engineering, Feb. 8, 1982, pp. 78-94, XP-000856868.

* cited by examiner

*Primary Examiner* — Aaron Dunwoody
(74) *Attorney, Agent, or Firm* — Baker & Hostetler LLP

(57) ABSTRACT

An embodiment of the present invention includes a header for a high-pressure apparatus of steam power plants, with the header having at least one nipple for welding on pipes for feed water and the pipe nipple protrudes to the outside from the header wall. The pipe nipple is formed integrally from the header wall. As a result, a weld joint between the pipe nipple as a first part and the wall of the header as a second part can be omitted, so that the production effort is reduced considerably in the case of large headers with many pipe nipples.

1 Claim, 2 Drawing Sheets

HEADER FOR A HIGH-PRESSURE APPARATUS OF STEAM POWER PLANTS

Figure 1:
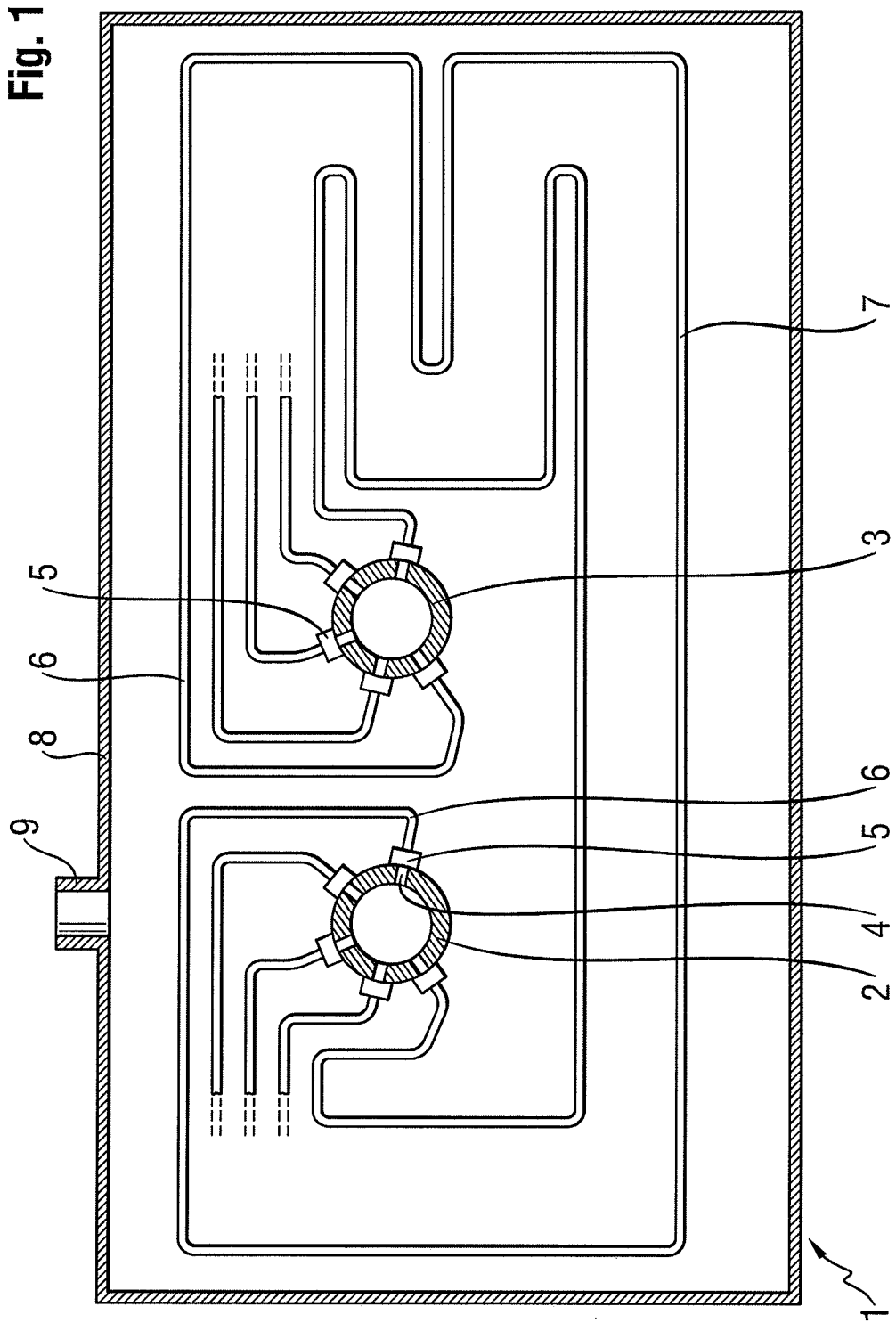

The invention relates to a header for a high-pressure apparatus of steam power plants, a method for producing such a header and a high-pressure apparatus with such a header.

A high-pressure apparatus, especially a high-pressure preheater, which comprises a header for an inlet of feed water (inlet header) and a header for an outlet of heated feed water (outlet header) is used in steam power plants. The headers are connected with each other by means of pipes, with the pipes being guided in a meandering manner in the high-pressure apparatus in the case of a specific type thereof. The pipes and thus the feed water are circulated around by a hot medium supplied under pressure into the high-pressure apparatus, so that the feed water is preheated.

The connection of a pipe for feed water to the header usually occurs with a pipe nipple. Various methods have become known to connect a pipe nipple with a header. In a first method, a nipple is turned from bar stock which is provided with a blind hole whose diameter is smaller than or equal to a later through hole. A cylindrical nose is provided on the face surface of the pipe nipple to be applied, which nose is inserted in the hole of the header wall to be applied. The cylindrical nose facilitates the determination of position and direction of the pipe nipple to be applied. After the insertion of the pipe nipple in the header wall, both parts are heated to approximately 120° C. and the pipe nipple is welded together with the header wall. Submerged arc welding is preferably used in this process. Thereafter, the two parts are annealed again and the blind hole through the originally non-bored part of the pipe nipple is extended by drilling and friction up to the header wall. In this procedure, the base of the weld seam is removed simultaneously. It can thus be ensured that an incomplete welding at the base of the weld seam and a notching effect are avoided. A dye penetration inspection and a visual inspection are performed subsequently. Very good results with respect to the fixing of the pipe nipple can be achieved with this method. The disadvantageous aspect in this method is however that after the welding of a pipe nipple, every single pipe nipple needs to be machined by metal-cutting. This causes a high amount of work and is time-consuming in the case of large headers with a plurality of pipes.

In order to simplify this method there is an approach to change the arrangement of the pipe nipple. In an alternative method, a pipe nipple is used which does not have a cylindrical nose, but is provided with a through hole. The wall thickness of the pipe nipple in the area of its face surface to be connected with the header wall is tapered, so that full penetration welding of pipe nipple and header wall is possible. Subsequent inside machining for producing the passage between pipe nipple and header wall and removal of the weld root by drilling open is no longer required. It is been noticed however that a pipe nipple with an annular contact surface for the header wall is difficult to align. For this purpose, the pipe nipple needs to be riveted prior to the actual welding, which leads to an increased amount of work. In the case of headers of a large diameter, the respective welding point is further not easily accessible, so that special welding equipment is required.

It is an object of the invention to provide a header for high-pressure apparatuses of steam power plants, which header comprises at least one pipe nipple which can be provided with a low amount of work and with a high amount of reliability. It is further an object of the invention to provide a method for producing such a header. It is further an object to provide a high-pressure apparatus for such a header.

These objects are achieved by features of the independent claims. Advantageous embodiments of the invention are the subject matter of the sub-claims.

The header in accordance with the invention for a high-pressure apparatus of steam power plants comprises at least one pipe nipple for welding on pipes for feed water, with the pipe nipple protruding outwardly from the header wall and the pipe nipple being formed integrally from the header wall. The pipe nipple is thus not an individual part which needs to be aligned, riveted and welded on a header wall. Metal-cutting of a through hole for removing the weld base is also not required. Annealing treatment up to a certain temperature is also no longer necessary in the header in accordance with the invention. Instead, the at least one pipe nipple is formed from the header wall. Pipe nipple and header wall are thus one part, so that difficulties by applying a weld seam for example cannot occur any longer. All problems which are linked to the joining of two different parts are avoided. Since the pipe nipple is formed integrally from the header wall, a pipe nipple on a header can be provided with a low amount of work and with high reliability.

According to an embodiment of the invention, the wall thickness of the pipe nipple is thicker at a first end which forms the transitional region to the header wall than at an opposite second end which is provided for welding on a pipe for feed water. A relatively high strength can thus be achieved in the area of the transition to the header wall, so that in the case of a torque load by the pipe the pipe nipple will remain reliably linked to the header.

The first end of the pipe nipple forms on its outside wall a collar with a concave shape in the cross section in an especially preferred way. This reduces the notch stresses in the region of the transition to the header wall. Moreover, such a shape is easy to produce. The pipe nipple is preferably made by means of metal-cutting. The header wall is thus removed by means of metal-cutting in the region of the pipe nipple, so that the pipe nipple will protrude from the header wall as a projection. Production by means of non-cutting forming is also possible, e.g. by means of pressure forming.

The method in accordance with the invention for producing a header as described above is characterized in that the pipe nipple is produced from the header wall by metal-cutting, especially by milling, such that it will protrude outwardly from the header wall. The pipe nipple is thus produced from the header wall which has a thicker wall thickness than in a header wall according to the state of the art. The wall thickness remaining after metal-cutting corresponds to the wall thickness that is conventionally present in headers produced according to the state of the art.

Although machining by metal-cutting is a very secure method with respect to strength and reliability of the transitional area between pipe nipple and header wall, a dye penetration inspection can be made for confirming the successfully performed process after machining by metal-cutting. It can thus be determined whether there are any cracks in the transitional region between pipe nipple and header wall.

In accordance with the invention, the high-pressure apparatus, especially a high-pressure preheater for a steam power plant, comprises a header, as described above.

Figure 2:
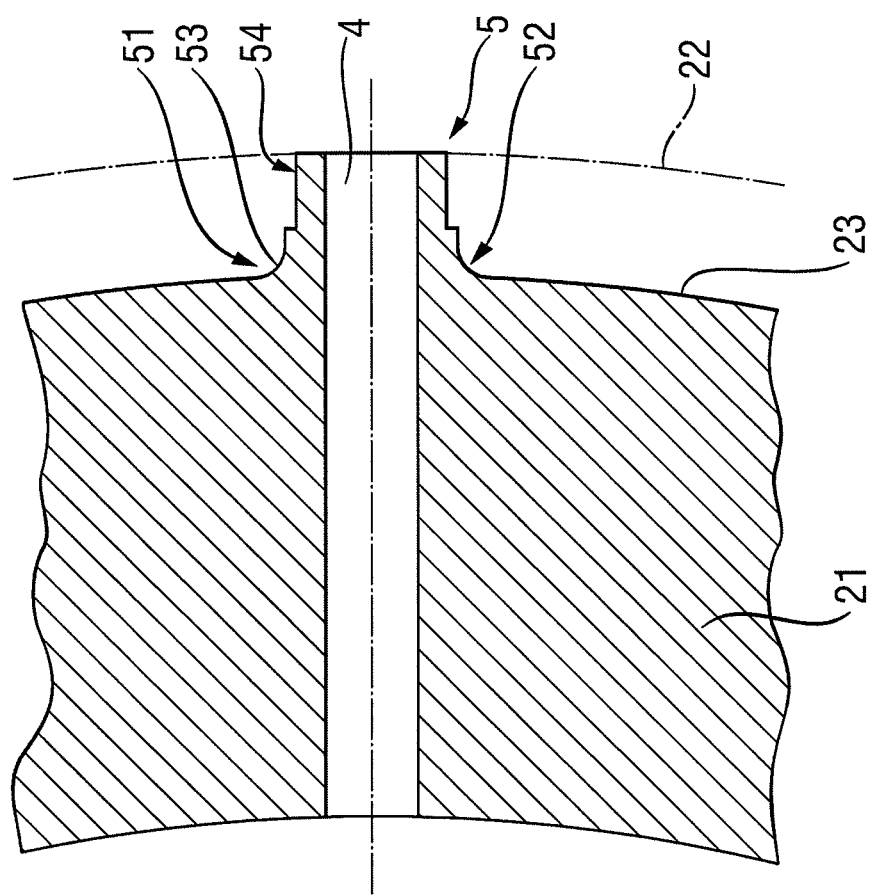

The invention is now explained in closer detail by reference to an embodiment shown in the drawings, wherein:

FIG. 1 shows a cross-sectional schematic view of a high-pressure preheater with two headers in accordance with the invention, and FIG. 2 shows a cross-sectional view through a header wall with an associated pipe nipple.

FIG. 1 shows a high-pressure preheater 1 in a cross-sectional schematic simplified view. The preheater comprises an inlet header 2 for the supply of feed water. The feed water is guided through a plurality of through holes 4 to the associated pipe nipples 5, through which the feed water can enter the attached pipes 6. Pipes 6 are arranged in the embodiment shown in FIG. 1 in such a way that they pass through the preheater in form of a pipe coil 7. An inlet 9 for feeding steam is provided at the edge of the preheater housing 8, which inlet is brought into contact with the pipe coils under pressure. The feed water present in the pipe coils is thus heated and reaches the outlet header 3 after passing the pipe coils. The pipes 6 are connected by means of pipe nipples 5 to the outlet header 3, as in the inlet header 2. After passing the pipe nipples 5 and running through an associated through bore through the wall of the outlet header 3, the heated feed water thus reaches a central conduit of the outlet header 3 and can leave the preheater 1.

The arrangement of a pipe nipple 5 on a header 2 or 3 in accordance with the invention is shown in FIG. 2. Only a section of an outside region of the header wall 21 is shown in a cross-sectional view of header 2 or 3. The original shape 22 of the header wall 21 is indicated with a broken line. The original shape 22 of the header wall is changed up to the shape indicated with reference numeral 23 by metal-cutting for example, until the pipe nipple 5 remains as a unchanged part of the header wall 21 and protrudes from the shape 23. In the embodiment shown in FIG. 2, the pipe nipple 5 has a first end 51 which is formed in the transitional region 52 between pipe nipple 5 and header wall 21 by a concave collar 53. An especially stiff connection is thus created between the pipe nipple 5 and the header wall 21 with respect to the strength of the transitional region 52, which connection can absorb any occurring torque load without any major likelihood for the formation of cracks in region 52.

The second end 54 is provided for the purpose of being connected with a pipe 6, with the pipe 6 not being shown in FIG. 2. The passage of feed water occurs through the through hole 4 which extends through the pipe nipple 5 and the header wall 21.

The invention claimed is:

1. A header for a high-pressure apparatus of steam power plants, comprising:
at least one pipe nipple for welding on pipes for feed water, the pipe nipple protruding outwardly from a header wall and being made integrally from the header wall by milling the header wall such that a free end of the nipple conforms to a circumferential shape of the header wall, wherein a wall thickness of the pipe nipple is thicker at a first end which forms a transitional region to the header wall than at an opposite second end which is provided for welding on a pipe for feed water, and wherein the transitional region defines a collar having an annular outside wall that forms an arcuate junction with the header wall.

* * * * *